United States Patent [19]

Biale

[11] 3,714,099
[45] Jan. 30, 1973

[54] SELF-CROSSLINKING VINYL ACETATE-ETHYLENE LATEXES
[75] Inventor: Giovanni Biale, Placentia, Calif.
[73] Assignee: Union Oil Company of California, Los Angeles, Calif.
[22] Filed: Sept. 3, 1970
[21] Appl. No.: 69,438

[52] U.S. Cl. .260/29.67 TA, 260/17 R, 260/17.4 ST, 260/29.6 T, 260/29.6 MN, 260/29.6 MQ, 260/78.5 E, 260/78.5 HC, 260/80.73
[51] Int. Cl. ............................................C08f 45/24
[58] Field of Search ..260/29.67 A, 29.67 I, 78.5 HC, 260/80.73, 78.5 E

[56] References Cited

UNITED STATES PATENTS

| | | | |
|---|---|---|---|
| 3,231,533 | 1/1966 | Garrett et al. | 260/29.6 TA |
| 3,262,985 | 7/1966 | Müller et al. | 260/29.67 TA X |
| 3,345,318 | 10/1967 | Lindemann et al. | 260/29.6 TA |
| 3,380,851 | 4/1968 | Lindemann et al. | 117/140 |
| 3,459,698 | 8/1969 | Mantell et al. | 260/29.4 |
| 3,404,113 | 10/1968 | Lindemann et al. | 260/29.6 T |
| 3,578,618 | 5/1971 | Beardsley | 260/29.6 TA X |

Primary Examiner—William H. Short
Assistant Examiner—L. M. Phynes
Attorney—Milton W. Lee, Richard C. Hartman, Lannas S. Henderson, Dean Sandford and Robert E. Strauss

[57] ABSTRACT

An aqueous latex of a vinyl ester polymer is described which has the property of forming self-curing films without the use of an extraneous curing additive. The latex is useful as a binder, particularly for non-woven fibers, or for wood panel coating or textile coating. The polymer comprises a major proportion of a vinyl ester monomer, typically vinyl acetate, which is interpolymerized with ethylene, a minor amount of a synergistic combination of cross-linking reactive comonomers, typically N-methylolacrylamide and di-allyl maleate, and a cure-catalyzing amount of an ethylenically mono-unsaturated carboxylic acid such as acrylic acid. The polymer is dispersed in an aqueous emulsion using an anionic or nonionic surfactant or mixtures thereof, typically a mixture of an alkaryl polyether alcohol and an alkali metal sulfosuccinate half ester of an ethoxylated alcohol.

17 Claims, No Drawings

SELF-CROSSLINKING VINYL ACETATE-ETHYLENE LATEXES

DESCRIPTION OF THE INVENTION

This invention relates to emulsions of cross-linking vinyl ester-ethylene interpolymers and, in particular, relates to such interpolymers which are capable of forming films having self-curing properties.

Aqueous dispersions of polymers have found increasing acceptance for use in textile and wood panel coating, as well as a binder of non-woven fibers, e.g., polyester fiber fills. In addition, the aqueous dispersions of such polymers have been used for sizing in the textile industry.

Latexes or aqueous dispersions of these polymers must possess a diversity of properties to be acceptable for such uses. Such compositions should form films which are cross-linkable into a highly insoluble resin coating, the resultant film should resist discoloration, have a high degree of clarity and be resilient and compressible. The latex compositions should be stable emulsions of the polymer in water and should have a sufficient viscosity and surface tension to permit spray application of the latex. After application, the polymer should cure rapidly and completely in a short time and at a low temperature so as to be satisfactory under most or all of a wide variety of curing condtions. Preferably, the polymer film should be self-curing to avoid the necessity for use of an extraneous catalyst.

Latexes of acrylic polymers have been used in the past for this application since such polymers have been found to possess a high degree of most of the foregoing properties. Acrylic monomers, however, are relatively expensive and a distinct advantage could be achieved if the less expensive vinyl ester or olefin monomers could be substituted as the major component of such polymers. These vinyl esters, and, in particular, vinyl acetate and ethylene, offer a distinct cost advantage over acrylics; however, difficulty has been experienced in achieving stable emulsions of vinyl ester polymers which contain sufficient cross-linking additives to attain the desired curing response. Prior latexes have also generally required the use of a curing agent, generally an acid or acidic salt, and have thus possessed a limited shelf life or required pre-application addition of the curing agent.

Vinyl acetate-ethylene interpolymers with N-methylolacrylamide have been described in U.S. Pat. Nos. 3, 380,851 and 3,345,318. The copolymerization of the N-methylolacrylamide results in some improvement for water resistance of films prepared from the latex of this polymer; however, the films even after oven curing have little resistance to hydrocarbon solvents such as benzene.

An object of this invention, therefore, is to provide a vinyl ester interpolymer which is cross-linkable.

Another object of this invention is to provide said interpolymer as a stable aqueous emulsion which is readily sprayable with existing equipment.

It is a further object of this invention to provide such an interpolymer which forms clear films that resist discoloration and have a high resiliency and compressibility.

It is also a further object of this invention to provide such an interpolymer which cures rapidly and completely under the wide variety of conditions commonly used for curing such polymer films.

Other and related objects will be apparent from the following description of the invention.

The foregoing objects are achieved by this invention which comprises an aqueous latex of an interpolymer comprising a major proportion of the vinyl ester interpolymerized with ethylene, a cross-linking amount of a reactive comonomer such as an N-alkylol acrylamide which is used in combination with a synergistic, polymerizable poly(ethylenically unsaturated)comonomer such as diallyl maleate and a cure-catalyzing amount of an ethylenically mono-unsaturated, mono- or di- carboxylic acid. The latex is prepared by emulsion polymerization using an emulsion stabilizing amount of an anionic or a nonionic surfactant or mixture thereof.

The major monomer in the interpolymer, which comprises from about 51 to about 98 weight percent thereof, is a vinyl ester. Vinyl esters of alkanoic acids having from one to about 10 carbons can be used, and typical examples of these include: vinyl formate, vinyl acetate, vinyl propionate, vinyl butyrate, vinyl isobutyrate, vinyl valerate, vinyl 2-ethylhexanoate, vinyl isooctanoate, vinyl nonoate, vinyl decanoate, vinyl pivalate, etc. Of the foregoing vinyl esters, vinyl acetate is the preferred monomer because of its ready availability and low cost as well as the superior properties of polymers prepared with this ester.

The vinyl ester polymers generally form films at temperatures slightly in excess of the common ambient temperatures. The film forming temperature of a polymer can be determined by a conventional procedure. In this procedure, a film of the polymer, usually a latex film, is applied to a metal surface and permitted to dry. A temperature differential is established on the metal surface using a standardized procedure and the quality of the dried film is visually inspected. The temperature of the metal surface immediately above the temperature at the region where cracks appear in the dried film is recorded as the limiting film forming temperature. A typical polyvinyl ester, polyvinyl acetate, has a film forming temperature of about 30°C. Accordingly, ethylene can be copolymerized with the vinyl ester to reduce the film forming temperature of the polymer. The ethylene can be used in an amount from 1 to about 30, preferably from 5 to about 25, percent of the total polymer weight, sufficient to effect an appreciable change in the film-forming temperature of the polymer.

The interpolymer also contains a minor quantity of an acid-curable, cross-linking comonomer. The preferred class of these comonomers is a copolymerizable, N-alkylol acrylamide or methacrylamide. The amount of this reactive comonomer is from about 0.5 to about 5.0, preferably from about 1 to about 3, percent of the polymer weight. The nitrogen substituent can be any suitable alkylol group such as methylol, ethylol, propylol, butylol, 2-ethylhexylol, decylol, etc., having from about 1 to about 10 carbons. The amide can be the amide of an ethylenically unsaturated carboxylic acid such as methacrylamide or acrylamide. Examples of suitable amides are: N-methylolacrylamide, N-ethylolacrylamide, N-isopropylolmethacrylamide, N-amylolacrylamide, N-hexylolacrylamide, N-decylolacrylamide, N-2-ethylhexylolacrylamide, N-nonylolmethacrylamide, etc. The preferred reagents are N-methylolacrylamide or N-methylolmethacrylamide because of their ready availability and lower cost.

Instead of, or besides, the aforementioned N-alkylol acrylamide of methacrylamide, there can be employed an equivalent weight amount of a cross-linking comonomer which is prepared by condensing formaldehyde with an N-3-oxohydrocarbon-substituted acrylamide. The parent compound which is used in this condensation has the following structure:

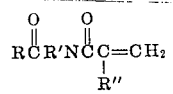

wherein R and R' are hydrogen or $C_1$ to about $C_6$ alkyl and R' is ethylene or $C_1$–$C_6$ alkyl substituted ethylene.

These parent compounds are described in U.S. Pat. No. 3,377,056 and typical examples of these include N-3-oxopropylacrylamide, N-3-oxobutylacrylamide, N-3-oxo-1-methyl-butylacrylamide, N-3-oxo-1,1-dimethyl-butylacrylamide, N-3oxo-1-methyl-1,3-dicyclohexylpropylacrylamide, N-3-oxo-1,2-dimethyl-1-ethyl-butylacrylamide, N-3-oxo-1,5-dimethyl-1-isopropylhexylacrylamide, N-3-oxo-1,1-diisobutylisopropyl-5-methyl-hexylacrylamide, N-3-oxo-1,1-dibutyl-2-N-propylheptylacrylamide, N-3-oxo-1-methyl-butyl-alpha-methylacrylamide, etc. Formaldehyde is reacted with the parent compound under acidic conditions so as to add from 1 to 5, typically an average of about 3, formaldehyde groups per molecule and produce a hydroxymethyl derivative. The typical example of such a derivative is hydroxymethyl diacetone acrylamide which is prepared by condensing 3 formaldehyde groups with N-3-oxo-1,1-dimethylbutyl acrylamide.

The interpolymer should also contain a minor amount, from about 0.01 to 2.0, preferably from about 0.05 to about 1.0, weight percent of a synergistic cross-linkable interpolymerizable comonomer. These comonomers which exhibit synergism with the aforementioned cross-linking comonomers are typically non-conjugated, polyethylenically unsaturated monomers. These monomers contain the ethylenic groups in non-conjugated positions and, typically, are esters of alcohols having terminally positioned ethylenic groups and/or of carboxylic acids having ethylenic groups that are in conjugated positions with the carboxyl group. Examples of these are the monoesters of terminally mono-unsaturated, $C_2$ to about $C_5$ alkenols with ethylenically mono-unsaturated, $C_3$ to about $C_6$ alkanoic acids; diesters of said alkenols with $C_3$ to about $C_6$ to saturated alkandioic acids or the mono- or diesters of said alcohols with ethylenically mono-saturated alkendioic acids. Other examples include the di- or tri- esters of said alkenols with cyanauric acid as well as the di- and tri- nitrogen substituted terminally unsaturated, $C_2$ to about $C_6$ alkenyl melamines. Other examples of cross-linking agents comprise the di- and tri- esters of di- and tri- hydroxy $C_2$ to about $C_6$ alcohols with said mono- unsaturated, $C_3$ to about $C_6$ alkenoic acids. The following are illustrative of the useful cross-linking agents: vinyl acrylate, allyl methacrylate, butenyl vinyl acetate, vinyl tiglate, divinyl oxalate, diallyl malonate, dibutenyl succinate, divinyl adipate, etc.; vinyl fumarate, diallyl fumarate, diallyl maleate, vinyl itaconate, dibutenyl itaconate, divinyl citraconate, etc.; diallyl cyanurate, divinyl cyanurate, tributenyl cyanurate, etc.; N,N',N''-triallyl melamine, N,N'-diallyl melamine, N,N'-dibutenyl melamine, etc.; ethylene diacrylate, ethylene divinylacetate, tetramethylene dimethacrylate, pentamethylene dimaleate, hexamethylene difumarate, triethylene glycol triacrylate, triethylene glycol trifumarate, triethylene glycol tritiglate, etc.

The self-curing properties are imparted to the interpolymer of this invention by the incorporation of a minor amount, e.g., from 0.05 to about 2.0, preferably from about 0.1 to about 1.0 weight percent of an ethylenically unsaturated mono- or di- carboxylic acid. Examples of suitable ethylenically unsaturated acids that can be used to impart this self-curing property include the monocarboxylic ethylenically unsaturated acids such as acrylic, vinyl acetic, tiglic, etc., as well as the dicarboxylic ethylenically unsaturated acids such as maleic, fumaric, itaconic, maleic, citraconic, hydromuconic, allylmolonic, etc. In general, these acids have from about three to about six carbon atoms. In addition to promotion of the curing of films prepared from the latex the acid tends to stabilize the latex emulsion.

The polymerization of the aforementioned monomers is performed by emulsion polymerization, generally under batchwise conditions; however, continuous processing can be employed if desired. The reactor used for the polymerization can be a jacketed kettle having stirring means with provisions to circulate a cooling medium through the jacket of the kettle to maintain the desired temperature. The aqueous medium is stirred to maintain dispersion of the monomers and the interpolymer in the aqueous medium. When necessary to achieve a stable latex, the pH of the aqueous medium can be controlled by the addition of various buffering agents. A suitable emulsifying agent of the anionic or nonionic types or combinations thereof is used in the polymerization. The amount of emulsifying agent is generally from about 1 to about 10, preferably from about 2 to about 8, weight percent of the monomers used in the polymerization.

A water soluble, free radical catalyst such as a water soluble peracid and salt thereof is used as the initiating catalyst and this can be used alone or in combination with an active reducing agent in a redox couple. The catalyst is used in concentration from about 0.01 to about 2, preferably from about 0.1 to about 0.5 weight percent of the monomers used in the polymerization.

If desired, the polymerization medium can also contain a minor quantity, e.g., from about 0.1 to about 5 weight percent of a protective colloid to improve the adhesiveness of the product.

With most cross-linking comonomers, it is preferred not to use any buffering agent since a buffer, which raises the pH of the polymerization and resultant latex, tends to decrease cross-linking. With highly reactive comonomers, i.e., those which undergo an excessive amount of cross-linking during polymerization such that the latex becomes unstable and tends to coagulate, a buffering agent can be added to reduce the degree of cross-linking which occurs during polymerization. Any suitable buffering agent can be used for this purpose. When a buffering agent is used, the pH can be maintained at a value from about 2.0 to 7.0 and most preferably from about 2.5 to 5.0 by its addition. Suitable agents comprise the alkali metal or ammonium salts of weak acids, e.g., sodium carbonate, potassium bicarbonate, lithium carbonate, potassium acid phthalate, potassium citrate, sodium acetate, potassium acid phosphate, etc.

The emulsifying agent can be any of the nonionic or anionic oil-in-water surface active agents. In the following discussion of emulsifying agents, frequent reference will be made to a cloud point of a particular agent. The cloud points which are recited are based on 1 weight percent aqueous solutions of the agent. A relatively hydrophobic agent is one having a cloud point below 190°F. and a relatively hydrophilic agent is one having a cloud point of 190°F. or above.

A single emulsifying agent can be used or the emulsifying agents can be used in combination. When combinations of emulsifying agents are used, it is advantageous to use a relatively hydrophobic emulsifying agent in combination with a relatively hydrophibic agent.

Suitable nonionic emulsifying agents include polyoxyethylene condensates represented by the following general formula:

$$R + CH_2-CH_2-O +_n H$$

where R is the residue of a fatty alcohol, acid, amide,  or amine having from 10 to 18 carbon atoms or an alkyl phenol having from 10 to 18 carbon atoms; and where n is an integer of 1 or above and preferably between 5 and 30. Some specific examples of polyoxyethylene condensates which can be used include polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide and N-lauryl-N-polyoxyethylene ethyl amine and the like; and polyoxyethylene thioethers such as polyoxyethylene n-dodecyl thioether.

Some examples of nonionic emulsifying agents which can be used include a polyoxethylene nonylphenyl ether having a cloud point of between 126° and 133°F. and marketed under the trademark "Igepal CO—630", and a polyoxyethylene nonylphenol ether having a cloud point above 212°F. and marketed under the trademark "Igepal CO—887". A similar polyoxyethylene nonylphenyl ether having a cloud point of about 86°F. is marketed under the trademark "Igepal CO—610" and is also a good emulsifying agent. Another agent is a polyoxyethylene octylphenyl ether having a cloud point of between 80° and 160°F. and marketed under the trademark "Triton X—100". Other emulsifying agents include a polyoxyethylene oleyl ether having a cloud point of between 80° and 160°F. and marketed under the trademark "atlas G—3915", and a polyoxyethylene lauryl ether having a cloud point above 190°F. and marketed under the trademark "Brij 35".

The nonionic emulsifying agents which can be used according to this invention also include a series of surface active agents known as "Pluronics". The "Pluronics" have the general formula:

$$HO(C_2H_4O)_a(C_3H_6O)_b(C_2H_4O)_cH$$

where a, b and c are integers between 1 and about 100. As the ratio of b to a and c increases, the compounds become less water soluble or more oil soluble and thus more hydrophobic, while as the ratio decreases the compounds become more water soluble and less oil soluble. An example of this class is "Pluronic L—64" which has a cloud point of about 140°F., a polyoxypropylene chain having a molecular weight of 1,500 to 1,800, and a polyoxyethylene content that is 40 to 50 percent of the total weight of the molecule. Another useful example is "Pluronic F—68", a polyoxyethylene-polyoxypropylene glycol having a cloud point of about 212°F. and a polyoxyethylene content of about 80 to 90 percent of the total weight of the molecule.

A class of suitable emulsifying agents are a series of ethylene oxide adducts of acetylenic glycols sold commercially under the name "Surfynols". This class of compounds can be represented by the formula:

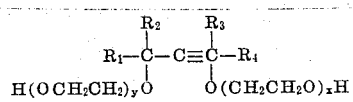

in which $R_1$ and $R_2$ are alkyl radicals containing from three to 10 carbon atoms, $R_2$ and $R_3$ are selected from the group consisting of methyl and ethyl, and x and y are integers having a sum in the range of 3 to 60, inclusive.

Representative of the "Surfynols" are "Surfynol 465" which is an ethylene oxide adduct of 2, 4, 7,9-tetramethyl decynediol containing an average of 10 moles of ethylene oxide per mole of the surface active agent. "Surfynol 485" corresponds to "Surfynol 465" but contains an average of 30 moles of ethylene oxide per mole of surface active agent. "Surfynol 485" has a cloud point above 212°F.

Anionic emulsifying agents which can be employed herein include anionic compounds obtained by sulfonation of fatty derivatives such as sulfonated tallow, sulfonated vegetable oils and sulfonated marine animal oils. Commercially available emulsifiers of this group are Tallosan RC, a sulfonated tallow marketed by General Dyestuff Corporation; Acidolate, a sulfonated oil marketed by White Laboratories, Inc.; and Chemoil 412, a sulfonated castor oil marketed by Standard Chemical Company.

Various sulfonated and sulfated fatty acid esters of mono- and polyvalent alcohols are also suitable such as Nopco 2272R, a sulfated butyl ester of a fatty ester marketed by Nopco Chemical Company; Nopco 1471, a sulfated vegetable oil marketed by Nopco Chemical Company; Sandozol N, a sulfated fatty ester marketed by Sandoz, Inc.; and Stantex 322, an ester sulfate marketed by Standard Chemical Products, Inc.

Sulfated and sulfonated fatty alcohols are also useful as an emulsifier and include anionic agents such as Duponal ME, a sodium lauryl sulfate, Duponal L142, a sodium cetyl sulfate, Duponal LS, a sodium oleyl sulfate which is marketed by E. I. duPont de Nemours and Company; and Tergitol 4, a sodium sulfate derivative of 7-ethyl-2-methyl, 4-undecanol, Tergitol 7, A sodium sulfate derivative of 3,9-diethyl tridecanol-6 and Tergitol 08, a sodium sulfate derivative of 2-ethyl- 1-hexanol, which are marketed by Union Carbide Corporation, Chemical Division.

A particularly useful class of anionic surfactants which can be employed comprises the $C_1$ to $C_{12}$ alkyl and $C_5$ to $C_8$ cycloalkyl esters of alkali metal sulfoalkanedioic acids having from 3 to about 6 carbons. Examples of these include diethyl sodium sulfosuccinate, di-n-octyl pottasium sulfosuccinate, dicyclohexyl lithium sulfoglutarate, di(methylcyclopentyl)sodium sulfoadipate, dicycloheptyl cesium sulfomalonate, diamyl sodium sulfoadipate, etc.

The half esterified, half ethoxylated derivatives of the aforementioned alkali metal sulfoalkanedioic acids are preferred emulsifiers. These agents have one of the carboxylic acid sites esterified with a $C_1$ to $C_{12}$ alkanol or $C_5$ to $C_8$ cycloalkanol and the remaining carboxylic acid site condensed with from 2 to about 20, preferably from 8 to 16 and, most preferably, from 10 to 12 ethylene oxide units per mole to add a polyethoxylol group. Examples of these are: hexyl polyethoxylol sodium sulfosuccinate, isopropyl polyethoxylol potassium sulfoglutarate, decyl polyethoxylol lithium sulfoadipate, cyclohexyl polyethoxylol cesium sulfomalonate, cycloheptyl polyethoxylol sodium sulfosuccinate, cyclooctyl polyethoxylol potassium sulfosuccinate, etc.

The polymerization is initiated by a water soluble free radical initiator such as a water soluble peracid or salt thereof, e.g., hydrogen peroxide, sodium peroxide, lithium peroxide, peracetic acid, persulfuric acid or the ammonium and alkali metal salts thereof, e.g., ammonium persulfate, sodium peracetate, lithium persulfate, potassium persulfate, sodium persulfate, etc. A suitable concentration of the initiator is from 0.05 to 5.0 weight percent and preferably from 0.1 to 3 weight percent.

The free radical initiator can be used alone and thermally decomposed to release the free radical initiating species or can be used in combination with a suitable reducing agent in a redox couple. The reducing agent is typically an oxidizable sulfur compound such as an alkali metal metabisulfite and pyrosulfite, e.g., sodium metabisulfite, potassium metabisulfite, sodium pyrosulfite, etc. A particularly preferred reducing agent is sodium or potassium formaldehyde sulfoxylate such as Formopon marketed by Rohm and Haas Company. The presence of the reducing agent in the polymerization medium achieves a release of free radicals at a lower temperature than necessary in its absence and thereby promotes formation of higher molecular weight copolymer products. The amount of reducing agent which can be employed throughout the copolymerization generally varies from about 0.1 to 3 weight percent of the amount of polymer, however, in a preferred embodiment, the reducing agent is only employed to initiate the reaction and hence is necessary only in small amounts which is generally between about 0.001 to 0.02 weight percent of polymer produced.

A protective colloid can be used to increase the adhesiveness of films prepared from the latex. The amount used can be from 0.1 to 3, preferably from 0.5 to 1.5 percent of the total weight of monomers. When the protective colloid is used it is desirable to decrease the amount of surfactant by an amount equivalent to the weight of the protective colloid, since the latter also aids the stability of the latex. This agent can be any of a wide range of compounds that are available for use as protective colloids, including many natural substances such as casein, natural gums, gelatins, agar, dextrin and globulin; suitably chemically modified polysaccharides such as hydrolyzed starch, hydroxyethyl cellulose, methyl cellulose, carboxymethyl cellulose and synthetic protective colloids such as polyvinyl alcohol, alkali metal or ammonium salts of sulfonated polystyrene, water soluble interpolymers of acrylic acid and 2-ethylhexyl acrylate, copolymers of acrylamide and acrylic acid, partially hydrolyzed polyacrylamide having from 10 to 70 percent of its amide groups as carboxylic acid or alkali metal carboxylate groups, etc. The polyvinyl alcohols, which are prepared by hydrolysis of polyvinyl esters, typically polyvinylacetate, are preferred protectice colloids and can be used with from 80 to 100 percent, preferably from about 90 to 100 percent of the ester groups hydrolyzed to hydroxyl groups.

The polymerization can be performed by batch polymerization wherein all the polymerization medium, emulsifier and comonomers are charged to the reaction vessel and the polymerization is started by thermal or redox reduction of the initiator. In a continuous process, the same materials can be continuously charged to a reactor. The polymerization is performed at conventional conditions comprising temperatures from about 70° to 225°F., preferably from 120° to 175°F and sufficient time to achieve a low monomer content, e.g., from 1 to about 8 hours, preferably from 3 to about 7 hours, to produce a latex having less than 1.5, preferably less than 0.5 weight percent free monomer.

The preferred procedure is a modified batch processing wherein the major amounts of some or all the comonomers and emulsifier are charged to the reaction vessel after polymerization has been initiated. In this manner, control over the copolymerization of monomers having widely varied degrees of reactivity can be achieved.

It is preferred to add the vinyl ester intermittently or continuously over the polymerization period which can be from 0.5 to about 10 hours, preferably from about 2 to about 6 hours. The ethylene content of the interpolymer depends on the ethylene content of the aqueous polymerization medium. Factors which control the ethylene content of the polymerization medium include the partial pressure of ethylene in the vapor phase over the medium, the temperature of polymerization and the degree of mixing between the vapor phase and the liquid medium. Generally the polymerization is performed at temperatures from 120° to 175°F. and, at these temperatures, ethylene partial pressures from 50 to 1,000, preferably from 250 to 750 psig. are sufficient to incorporate from 1 to 30, preferably from 5 to 25, weight percent ethylene in the polymer. The reaction medium is preferably agitated with a stirrer, however, other agitation can be used such as sparging the liquid with recirculated ethylene from the vapor phase. In the preferred procedure, the ethylene partial pressure is maintained constant throughout the polymerization period so that this monomer is continuously supplied at a constant rate.

The methacrylamide and acrylamide derivatives that are used as the acid curable cross-linking comonomers, i.e., N-alkylol methacrylamide or acrylamide or the formaldehyde condensates of the N-3-oxohydrocarbyl acrylamides, are preferably slowly added during polymerization to avoid an excessive increase in viscosity of the latex which otherwise occurs when the entire amount of these comonomers is added to the initial charge to the polymerization vessel. The polymerizable acid catalyst is also, preferably, continuously or intermittently added during the polymerization. From 40 to 100 percent of the amount of these comonomers can be added in this fashion, the balance, if any, being introduced with the initial charge.

When a synergistic cross-linking comonomer is used, it entire quantity can be added to the initial charge at the outset of polymerization. If desired, substantial amounts, e.g., from 40 to 100 percent of the total amount of this comonomer, can be intermittently or continuously added during the polymerization. Some of these comonomers such as the allyl esters are relatively less reactive and it is, therefore, preferred to add these comonomers at a sufficient rate that their addition is completed for a substantial period, e.g., about 15 minutes to about two hours, before addition of the last of other monomers has been completed. In this manner, accumulation of the slower reacting monomer in the latex, which may cause its coagulation, is avoided.

The emulsifier used in the polymerization can also be added, in its entirety, to the initial charge to the polymerization zone or a portion of the emulsifier, e.g., from 90 to 25 percent thereof, can be added continuously or intermittently during polymerization.

The latexes produced by this polymerization can contain from about 35 to 65 weight percent solids comprised chiefly of the interpolymer. The preferred contents of solids are from 40 to 60, and, most preferred, from 50 to about 60 weight percent. The particle size of the latex is quite small, generally less than 1.0 micron and, preferably, less than about 0.5 micron.

The degree of cross-linking of films prepared from the latex can also be further improved by the addition of an extraneous acid catalyst. The films are highly cross-linkable without such catalyst, e.g., they can be cured in cross-linked films which remain from about 70 to 95 weight percent insoluble in benzene after room temperature immersion therein for 16–18 hours. In some instances, greater solvent resistance may be desired and this can be attained by the addition of from 0.01 to 5.0, preferably from 0.1 to 1.5 weight percent of an acidic additive to the latex shortly before its application or use. Various acidic additives can be used for this purpose including inorganic acids such as sulfuric, nitric, orthophosphoric, polyphosphoric, hydrochloric, hydrofluoric acids, etc.; as well as organic $C_1$ to about $C_6$ alkyl and $C_6$ to about $C_9$ aryl sulfonic acids such as: methane, ethane, isopropane, butane, 2-methylbutane, hexane sulfonic acids, etc.; benzene, p-toluene, cumene, ethylbenzene, xylene sulfonic acids, etc. Salts of these acids with fugative, i.e., volatilizable, bases such as the ammonium and the $C_1$ to $C_5$ alkyl ammonium salts can also be used. Examples of these are: di- and mono- ammonium orthophosphate, ammonium nitrate, ammonium p-toluene sulfonate, amyl ammonium chloride, dimethyl ammonium fluoride, methyl ammonium cumene sulfonate, etc.

The following examples will illustrate the practice of the invention and serve to demonstrate results obtainable therewith:

EXAMPLE 1

A jacketed autoclave reactor of half-gallon capacity provided with an electric stirrer is used in the following examples. The autoclave is fitted with a thermometer and an inlet to introduce ethylene and inlets to introduce liquid monomer mixtures during the polymerization. A steam line and a cooling water line are connected to the jacket to provide heating and cooling, respectively, of the autoclave contents.

The autoclave is charged with 475 grams water, 63.8 grams Triton X405 (70 percent aqueous solution of octylphenol condensed with an average of 40 ethylene oxide units), 8 grams Pluronic F68 (a block copolymer of ethylene and propylene oxides having a polyoxypropylene molecular weight of 1501-1800 and 80 percent of the molecule being polyoxyethylene), 72 grams vinyl acetate and 3 grams potassium persulfate. The autoclave is pressured to 100 psig and then exhausted to the atmosphere three times with nitrogen followed by two times with ethylene. The autoclave is then pressured to 400 psig with ethylene, heated to 160°F. and the stirrer is operated at 300 revolutions per minute. The ethylene pressure is adjusted to 500 psig and maintained at this value throughout the run by periodic introduction of ethylene.

The polymerization is continued over a period of about 6 hours. During the first hour, a solution of 2.1 grams diallyl maleate in 320 grams vinyl acetate is slowly added to the autoclave and during the next hour 300 grams vinyl acetate are slowly added. Also slowly added during the first two hours of polymerization is a solution of 11.5 grams of a 60-weight percent aqueous solution of N-methylolacrylamide and 3.5 grams itaconic acid dissolved in 50 grams water.

After the prescribed period, the autoclave is cooled, depressured and its contents removed. The latex is found to contain 59.4 weight percent solids and 0.9 weight percent residual monomer. The latex has a viscosity of 2025 centipoises and a pH of 2.5 The polymer is found to contain 10.5 weight percent ethylene.

A film of about 6 mils thickness of the latex is applied to a glass plate and the plate is placed in an oven at 270°F. for 3 minutes, removed and cooled. The resultant film has a thickness of about 3 mils. The film is immersed in benzene at 75°F. for 16–18 hours and the weight of film remaining undissolved is found to be 88.9 weight percent of the total film, indicating a high solvent resistance.

EXAMPLE 2

The procedure is repeated using only vinyl acetate and ethylene to yield a latex having about 60 weight percent solids and 1.8 weight percent residual monomer. The latex has a viscosity of 925 centipoises and the polymer contains 11.0 weight percent ethylene. A film of latex is applied to a glass plate and subjected to the treatment described in the preceding example and it is found that only 3.6 percent of the film remains undissolved after 16-18 hours in benzene.

EXAMPLE 3

The polymerization of Example 2 is repeated except that 2.1 grams diallyl maleate is dissolved in the vinyl acetate which is added during the first three hours of polymerization. The resultant latex contains 60 percent solids and 1.4 percent residual monomer, and has a viscosity of 1,475 centipoises and a pH of 5.1. The polymer contains 13.3 percent ethylene. A sample of the film after curing at 270°F. for 3 minutes fails to have solvent resistance, only 9.0 weight percent remaining undissolved after immersion in benzene at 75°F. for 16–18 hours.

EXAMPLE 4

The polymerization of Example 2 is repeated except that 11.5 grams of the aqueous solution of 60 weight percent N-methylol-acrylamide are dissolved in 50 grams water and this solution is slowly added with vinyl acetate over a 3 hour addition period. The resultant latex has 62.8 percent solids, 1.8 percent residual monomer and a viscosity of 3,625 centipoises and a pH of 5.4. The polymer contains 10.5 percent ethylene. A sample of the film cured as previously described fails to have solvent resistance, only 4.6 percent remaining undissolved, after 16–18 hours immersion in benzene at 75°F.

EXAMPLE 5

The polymerization of Example 1 is repeated except that no itaconic acid is added. The resultant latex has 60.2 percent solids, 1.8 percent residual monomer, a viscosity of 1050 centipoises and a pH of 2.3. The polymer contains 10.5 percent ethylene. A sample of the film when cured as previously described has fair to good solvent resistance, 76.4 percent remaining undissolved after 16–18 hours immersion in benzene at 75°F. This, however, is significantly more soluble than the film of Example 1 which also contained interpolymerized itaconic acid.

EXAMPLE 6

The procedure of Example 1 is repeated with the substitution of 2.1 grams of N,N,N-triallycyanurate for the diallyl maleate. The resultant latex contains 60.8 weight percent solids and 1.6 weight percent residual monomer. It has a viscosity of 2600 centipoises and a pH of 2.7. Films prepared from the latex after curing for 3 minutes at 270°F. have solvent resistance, 76 weight percent remaining undissolved after 18 hours in benzene at 75°F.

EXAMPLE 7

The procedure of Example 1 is repeated with the substitution of 12 grams of a 50 weight percent aqueous solution of hydroxymethyl diacetone acrylamide for the N-methylolacrylamide. The resultant latex contains 60.5 weight percent solids and 2.4 weight percent residual monomer. Its viscosity is 1,675 centipoises and pH is 3.6. Films prepared from the latex after curing for 3 minutes at 270°F. have solvent resistance, 67.4 weight percent remaining undissolved after 18 hours in benzene at 75°F.

EXAMPLE 8

The polymerization of Example 1 is repeated with the substitution of 28 grams Aerosol A 102 (A 30 weight percent aqueous solution of disodium sulfosuccinate ester of an ethylene glycol mono $C_{10}$–$C_{12}$ alkyl ether) for the Pluronic previously used; the amount of N-methylolacrylamide is increased to 23.4 grams of the 60 weight percent solution; and the ethylene pressure during polymerization is maintained at 250 psig. The resultant latex contains 47.8 weight percent solids and 0.8 weight percent residual monomer, and has a viscosity of 100 centipoises and a pH of 3.5. The polymer contains 8 weight percent ethylene. A sample of the film after curing at 270°C. for 3 minutes has excellent solvent resistance, 88.2 weight percent remaining undissolved after 16–18 hours in benzene at 75°F.

Viscosities reported herein are determined at 24°C.

The latexes as prepared herein have sufficient stability to insure a long shelf life. In some instances, however, stability under high shear conditions is desirable. This stability is commonly referred to as mechanical stability and is determined by placing a sample of the latex in a Waring blender operated at a high speed for up to about 15 minutes. If the latex sample remains stable after this treatment, the latex has excellent mechanical stability. Such stability can be imparted to the latexes by a post polymerization treatment. This treatment comprises adjustment of the latex pH, when necessary, to raise its value to 6.5 to 8.5, preferably to 7.0 by the addition of a volatilizable base such as ammonia, ammonium hydroxide and the $C_1$ to $C_5$ alkyl amines, e.g., methyl amine, trimethyl amine, amyl amine, etc., and the addition of from 0.5 to 1.5 percent of the polymer weight of an anionic surfactant. A typical preferred post treatment would comprise the addition of ammonium hydroxide to raise the latex pH to 7.0 and the addition of 1 weight percent Aerosol MA-80, dihexyl sodium succinate.

The preceding examples are intended solely to illustrate the presently preferred mode of practice of the invention and to demonstrate results obtainable therewith. It is not intended that the examples be construed as unduly limiting of the invention, but instead, that the invention be defined by the reagents and conditions, and their obvious equivalents, set forth in the following claims.

I claim:

1. An aqueous latex of a vinyl ester polymer having the property of forming self-curing films without the use of an extraneous curing additive which comprises water; from 1 to about 10 weight percent of an anionic or nonionic surfactant or mixture thereof and from 30 to about 65 weight percent of a polymer comprising:
   a major proportion of a vinyl acetate interpolymerized with the following comonomers:
   from 1 to about 30 weight percent ethylene, sufficient to effect a reduction in the film forming temperature of the polymer;
   from 0.5 to 5.0 weight percent of an acid curable cross-linking comonomer selected from the class of N–$C_1$ to $C_{10}$ alkylol acrylamide or methacrylamide or a formaldehyde condensate of the following:

$$\text{R}\overset{\overset{\text{O}}{\|}}{\text{C}}\text{R'N}\overset{\overset{\text{O}}{\|}}{\underset{\underset{\text{R''}}{|}}{\text{C}}}\text{C}=\text{CH}_2$$

wherein:

R and R' are hydrogen or $C_1$ to about $C_6$ alkyl; and R'' is ethylene or $C_1$ to $C_6$ alkyl substituted ethylene;

from 0.01 to 2.0 weight percent of a cross-linkable comonomer selected from the class consisting of the di esters of terminally unsaturated $C_2$ to about $C_6$ alkenols with ethylenically unsaturated $C_4$ to $C_6$ alkendioic acids, di- or tri- esters of said alkenols with cyanuric acid; and from 0.05 to about 2.0 weight percent of an acid catalyst comprising an ethylenically unsaturated, aliphatic, mono or di carboxylic acid having from three to about six carbons.

2. The latex of claim 1 wherein ethylene constitutes from 5 to 25 weight percent of the polymer.

3. The latex of claim 1 wherein said acid curable cross-linking comonomer is an N-alkylolacrylamide.

4. The latex of claim 3 wherein said N-alkylolacrylamide is N-methylolacrylamide.

5. The latex of claim 1 wherein said cross-linkable comonomer is an ester of an ethylenically unsaturated $C_4$ to $C_6$ alkendioic acid and a terminally unsaturated $C_2$ to about $C_6$ alkenol.

6. The latex of claim 5 wherein said ester is diallyl maleate.

7. The latex of claim 1 wherein said emulsifier is a nonionic emulsifier.

8. The latex of claim 7 wherein said emulsifier comprises a mixture of a polyoxyethylene condensate with an alkylphenol and a block copolymer of polyoxypropylene and polyoxyethylene.

9. The latex of claim 1 wherein said acid catalyst is acrylic or methacrylic acid.

10. The latex of claim 1 wherein said catalyst is itaconic acid.

11. An aqueous latex of a vinyl acetate polymer having the property of forming self-curing films without the use of an extraneous curing additive which comprises water, from 1 to about 10 weight percent of an anionic or nonionic surfactant or mixture thereof and from 30 to about 65 weight percent of a polymer consisting essentially of:

from 1 to about 30 weight percent ethylene, sufficient to effect a reduction in the film-forming temperature of the polymer;

from 0.5 to 5.0 weight percent of an N–$C_1$ to $C_{10}$ alkylolacrylamide or methacrylamide;

from 0.01 to 2.0 weight percent of the mono- or diester of a terminally unsaturated $C_2$ to about $C_6$ alkenol with an ethylenically unsaturated $C_4$ to $C_6$ alkendioic acid or the di- or tri- ester of said alkenol with cyanuric acid;

from 0.05 to about 2.0 weight percent of an ethylenically unsaturated, aliphatic, mono- or di- carboxylic acid having from three to about six carbons; and the balance of said polymer being vinyl acetate.

12. The latex of claim 11 wherein ethylene constitutes from 5 to 25 weight percent of the polymer.

13. The latex of claim 11 wherein said ester of said alkendioic acid is diallyl maleate.

14. The latex of claim 13 wherein said N-alkylol acrylamide is N-methylol acrylamide.

15. The latex of claim 11 having an improved stability with a pH from 6.5 to 8.5 and being prepared by the addition to the latex after its polymerization of from 0.5 to 1.5 weight percent of an anionic surfactant and a sufficient quantity of ammonia, ammonium hydroxide or a $C_1$ to $C_5$ alkylamine to raise the pH of said latex to said value.

16. The latex of claim 15 wherein said anionic surfactant is dihexylsodium sulfosuccinate.

17. The latex of claim 11 wherein said surfactant is the disodium sulfosuccinate ester of an ethylene glycol mono- $C_{10}$ to $C_{12}$ alkylether.

* * * * *